United States Patent
Carroll et al.

(10) Patent No.: US 8,403,642 B2
(45) Date of Patent: Mar. 26, 2013

(54) WIND TURBINE ROTOR BLADE ASSEMBLY WITH ROOT CURTAIN

(75) Inventors: Christian A. Carroll, Simpsonville, SC (US); Jonathan Glenn Luedke, Simpsonville, SC (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/246,064

(22) Filed: Sep. 27, 2011

(65) Prior Publication Data

US 2012/0141281 A1    Jun. 7, 2012

(51) Int. Cl.
*F04D 29/38*    (2006.01)
(52) U.S. Cl. .......................................... 416/62; 416/239
(58) Field of Classification Search .................. 416/239, 416/240, 62
See application file for complete search history.

(56) References Cited

U.S. PATENT DOCUMENTS

| 7,604,461 | B2 | 10/2009 | Bonnet |
| 7,637,721 | B2 | 12/2009 | Driver et al. |
| 7,837,442 | B2 | 11/2010 | Kirtley et al. |
| 2008/0166235 | A1 | 7/2008 | Standish et al. |
| 2010/0028161 | A1 | 2/2010 | Vronsky et al. |

OTHER PUBLICATIONS

Co-pending U.S. Appl. No. 13/112,148, filed May 20, 2011.

*Primary Examiner* — Dwayne J White
(74) *Attorney, Agent, or Firm* — Dority & Manning, P.A.

(57) ABSTRACT

A wind turbine rotor blade assembly includes a rotor blade having a pressure side, a suction side, a leading edge, and a trailing edge extending in a generally span-wise direction between a tip and a root. An edge extension is attached along either or both of the leading edge or trailing edge in a generally span-wise direction from adjacent the root towards the blade tip, with the edge extension having a contoured outer surface that defines a generally continuous aerodynamic surface. The edge extension has a terminal end that is spaced from root. A curtain is attached to the edge extension and extends in a span-wise direction from the terminal end t to the root. The curtain is formed from a pliant, flexible material that accommodates connection of the root to a rotor hub, as well as pitch movement of the rotor blade relative to the hub.

18 Claims, 4 Drawing Sheets

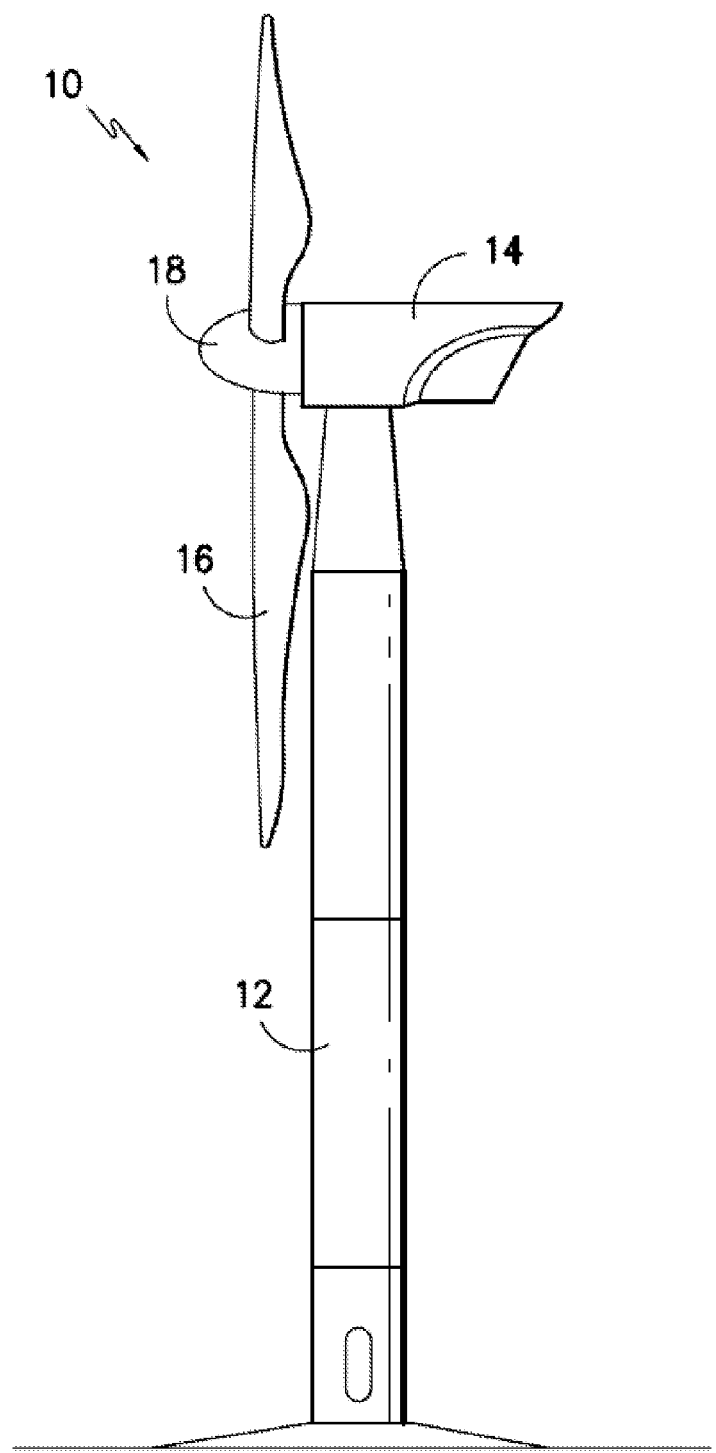
*Fig. -1-*
*Prior Art*

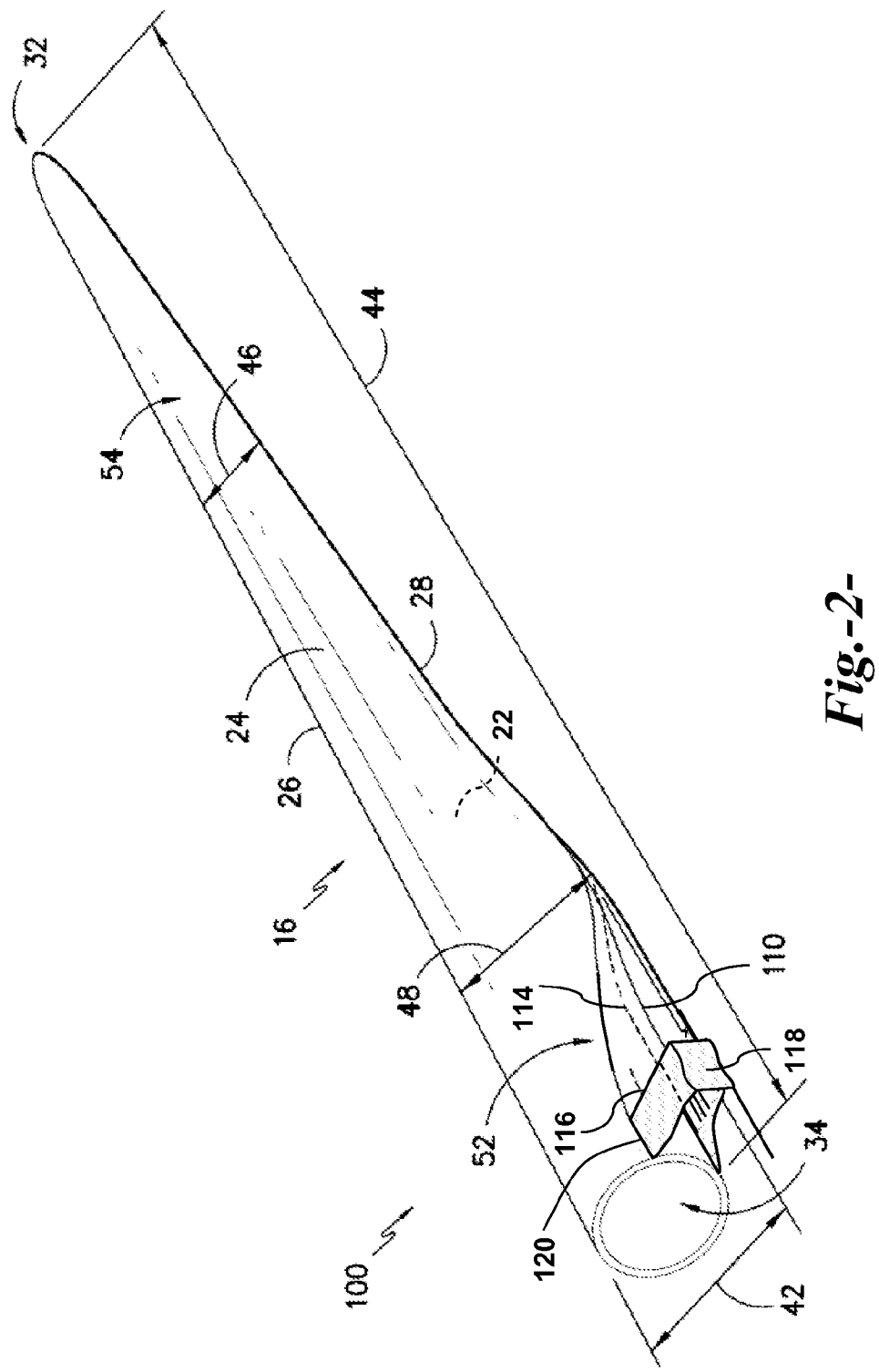
Fig.-2-

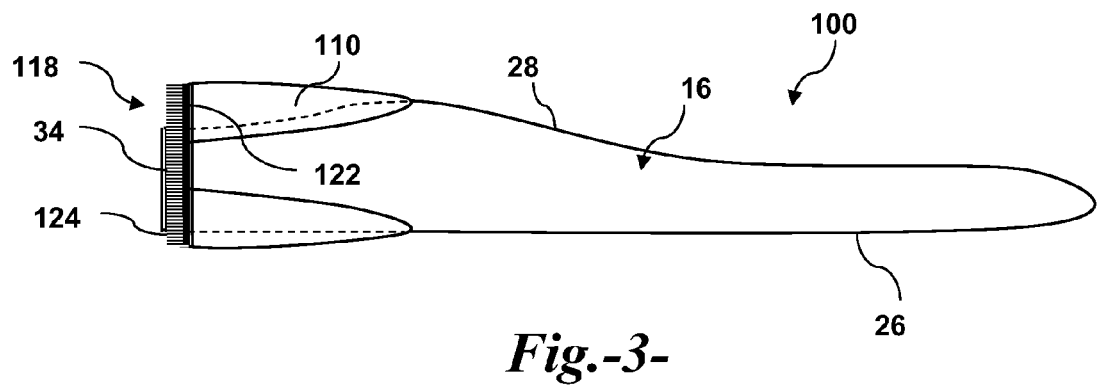
Fig.-3-
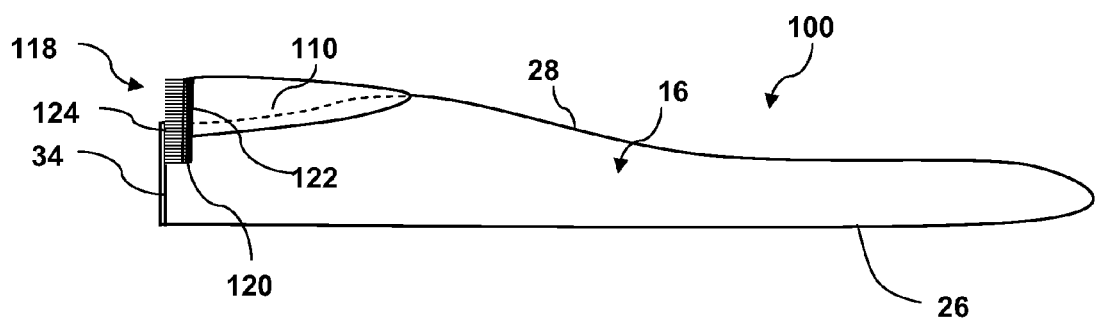
Fig.-4-
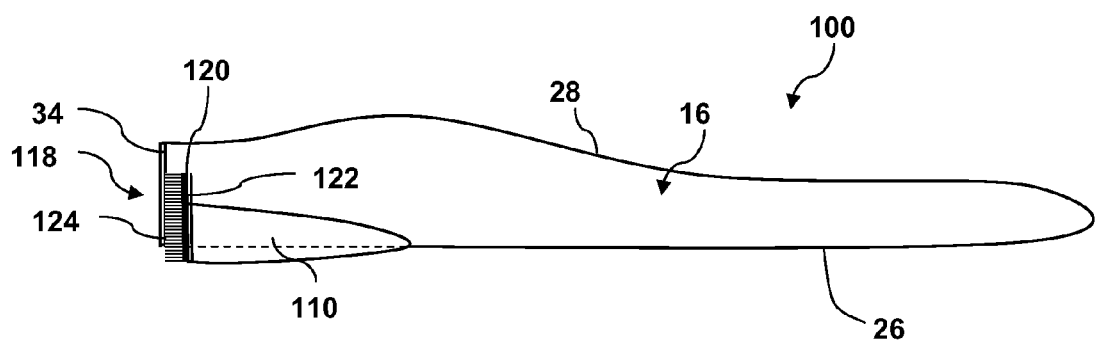
Fig.-5-

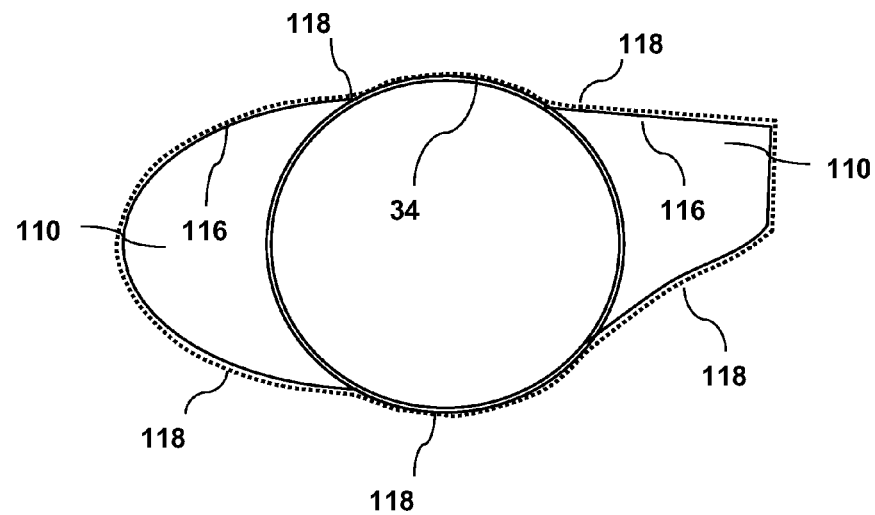
Fig.-6-
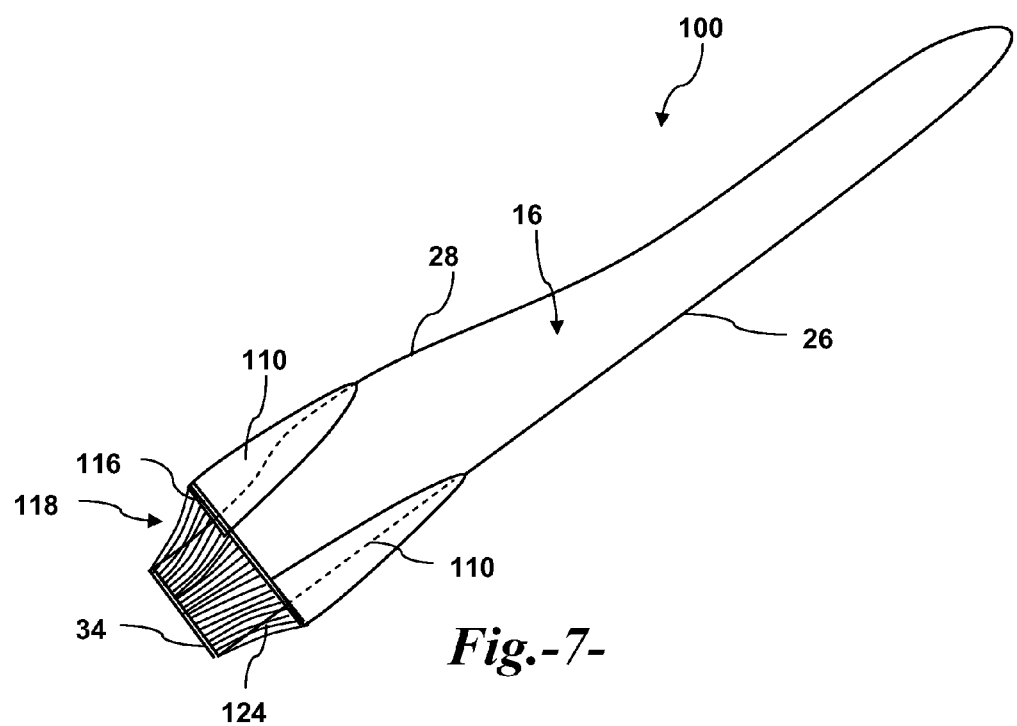
Fig.-7-

WIND TURBINE ROTOR BLADE ASSEMBLY WITH ROOT CURTAIN

FIELD OF THE INVENTION

The present disclosure relates in general to wind turbine rotor blades, and more particularly to a root curtain for a wind turbine blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Rotor blades in general are increasing in size, in order to become capable of capturing increased kinetic energy. However, the shape of a typical wind turbine rotor blade results in a relatively large aerodynamic separation region, due to the contour of the rotor blade. Specifically, the contour of the inner portion of the rotor blade adjacent to and including the cylindrical root causes such separation. In some cases, this inner portion may include 30%, 40% or more of the rotor blade. The separation region causes relatively significant energy losses by creating drag. Further, these losses are amplified as rotor blade sizes are increased.

Add-on extensions or other structures have been suggested for improving the aerodynamic profile of the inner portion of the rotor blade. Reference is made, for example, to U.S. Pat. No. 7,837,442. An issue, however, exists in effectively utilizing these structures at the cylindrical root configuration, which is necessary for facilitating connection of the blade to the rotor hub. Tapering of the extension structures in the direction of the blade root, or terminating the extensions spaced from the blade root, results in decreased aerodynamic performance.

Thus, an improved assembly that more effectively utilizes the benefits of a root-end leading or trailing edge extension would be desired.

BRIEF DESCRIPTION OF THE INVENTION

Aspects and advantages of the invention will be set forth in part in the following description, or may be obvious from the description, or may be learned through practice of the invention.

In one embodiment, a wind turbine rotor blade assembly is provided, and includes a rotor blade having a pressure side, a suction side, a leading edge, and a trailing edge extending in a generally span-wise direction between a tip portion and a blade root. An edge extension is attached along either or both of the leading edge or said trailing edges and extends in a generally span-wise direction from adjacent the root towards the tip. The edge extension has a contoured outer surface that defines a generally continuous aerodynamic surface and a terminal end spaced from the root. A curtain is attached to the edge extension and extends in a span-wise direction from the terminal end to the root. The curtain is formed from a pliant, flexible material that accommodates connection of the blade root to a rotor hub and pitch control movement of the rotor blade relative to the rotor hub.

The assembly is not limited by the type of material that defines the curtain. The material may be, for example, any configuration of woven or non-woven materials that are suitable for the operating environment of a wind turbine. The curtain may be permeable to air, water, moisture, and so forth, so as to prevent buildup of debris around the blade root. In a particular embodiment, the curtain is defined by a brush-like member having a plurality of individual bristles that extend in a generally span-wise direction from the terminal end of the edge extension to the blade root. The bristles may extend generally parallel to the root portion of the blade or, in one embodiment, may angle towards and gather around the blade root. The bristles may extend from a header portion or strip that attaches to the blade.

The curtain may encircle the terminal end of the extension and attach to the blade root without extending completely around the root. In another embodiment, the curtain may completely encircle the terminal ends of the edge extensions and the blade root in a closed loop configuration.

The invention also encompasses any manner of wind turbine configuration having one or more rotor blades configured with an edge extension and curtain in accordance with aspects presented herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a conventional wind turbine having one or more rotor blades that may incorporate an edge extension and respective curtain in accordance with aspects of the invention;

FIG. 2 is a perspective view of a rotor blade with a trailing edge extension and curtain;

FIG. 3 is a view of a wind turbine blade having leading and trailing edge extensions and respective curtains;

FIG. 4 is a view of a wind turbine blade having a trailing edge extension and respective curtain;

FIG. 5 is a view of a wind turbine blade having a leading edge extension and respective curtain;

FIG. 6 is an end view of a blade root with leading and trailing edge extensions and a closed loop curtain configuration; and FIG. 7 is perspective view of a rotor blade with and edge extension curtain that is gathered around the blade root.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, an exemplary rotor blade 16 according to aspects of the present disclosure includes exterior surfaces defining a pressure side 22 and a suction side 24 extending between a leading edge 26 and a trailing edge 28. The blade 16 extends from a blade tip 32 to a blade root 34. The exterior surfaces may be aerodynamic surfaces having generally aerodynamic contours, as is generally known in the art.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may further define a chord 42 and a span 44 extending in chord-wise and span-wise directions, respectively, as illustrated in FIG. 2. The chord 42 may vary throughout the span 44 of the rotor blade 16. Thus, a local chord 46 may be defined for the rotor blade 16 at any point on the rotor blade 16 along the span 44. Further, the rotor blade 16 may define a maximum chord 48, as shown.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 33%, 40%, 50%, or any other percentage of the span 44 extending from the root 34. The outboard area 54 may be a span-wise portion of the rotor blade 16 extending from the tip 32, and may in some embodiments include the remaining portion of the rotor blade 16 between the inboard area 52 and the tip 32.

Still referring to FIG. 2, a blade assembly 100 in accordance with aspects of the invention includes an edge extension 110 configured with the rotor blade 16. The edge extension 110 is a generally static component mounted to the rotor blade 16 in the inboard area 52 of the blade. The edge extension 110 has an end 116 spaced from the root 34 and extends in the generally span-wise direction towards the tip 32. Thus, the end 116 of the edge extension 110 is spaced from the root 34, while the opposite end is positioned between the root 34 and the tip 32 in the inboard area 52, and may extend to the maximum chord 48. The edge extension 110 alters the contour of a portion of the rotor blade 16 adjacent to the root 34 and, in doing so, reduces or eliminates any airflow separation region in this portion of the rotor blade 16, and further reduces the drag associated with the rotor blade 16 and increases the performance rotor blade 16.

The edge extension 110 includes an inner surface that is conformingly mounted to at least one of the pressure side 22, the suction side 24, or the trailing edge 28 such that when the edge extension 110 is mounted to the rotor blade 16, relatively little or no air may pass between the inner surface of the edge extension 110 and the pressure side 22, the suction side 24, and/or the trailing edge 28. It should be understood that the inner surface may be conformingly mounted to any combination of the pressure side 22, the suction side 24, or the trailing edge 28.

The edge extension 110 includes an outer surface 114 that defines a generally continuous aerodynamic surface with one or more of the exterior surfaces of the rotor blade 16. For example, the outer surface 114 and at least one of the pressure side 22 or the suction side 24 define a generally continuous aerodynamic surface. A generally continuous aerodynamic surface is a surface that has a generally continuous aerodynamic contour.

In some embodiments, the edge extension 110 may have a generally decreasing cross-sectional area in the span-wise direction towards the tip 32. Alternatively, however, the edge extension 110 may have a generally increasing cross-sectional area in the span-wise direction towards the tip 32, or may have a generally constant cross-sectional area.

It should be appreciated that the present invention is not limited to any particular shape, length, or configuration of the aerodynamic edge extensions 110.

Still referring to FIG. 2, the rotor blade assembly 100 includes a curtain 118 that is attached to the end 116 of the blade extension 110. The curtain 118 is formed from any suitable pliant, flexible material that is able to accommodate connection of the blade root 34 to the rotor hub 18 (FIG. 1), as well as accommodate movement of the rotor blade 16 relative to the rotor hub 18 that occurs, for example, during pitch control rotation of the blade 16 relative to the rotor hub 18. The curtain 118 extends from the terminal end 116 of the blade extension 110 to a position that is between the root 34 and the terminal end 116, which may be immediately adjacent to the root 34, or at least to the root 34. It should be appreciated that this position includes a slight over-extension or slight under-extension of the curtain 118 relative to the root 34. In certain embodiments, the curtain 118 may have a length and configuration such that it contacts the rotor hub 118 when the blade 16 is in a fine pitch position.

The curtain 118 provides several benefits. For example, it allows for maximum use of the span-wise length of the blade edge extension 110 and, thus, an overall increased use of the blade span 44. The curtain 118 also suppresses the development of large, high-loss, shed vortices from the root 34 in that the curtain 118 reduces the amount of span-wise flow emanating from the root cylinder 34 onto the blade 16.

The curtain 118 is not limited in the type or combination of materials that define the curtain 118. For example, the curtain 118 may be formed from any manner of non-woven or woven material that is sufficiently pliant and flexible to accommodate the various rotational positions of the blade 16 relative to the rotor hub 18. In a particular representative embodiment illustrated in FIGS. 3 through 5, the curtain 118 is defined by a brush-like component having a plurality of bristles 124 that extend span-wise to the blade root 34. The bristles may be relatively tightly clustered so as to define a generally continuous aerodynamic surface that extends from the terminal end 116 of the edge extension 110 towards the blade root 34. The bristles 124 may extend from any manner of suitable header 122 that is attached at the terminal end 116 of the blade extension 110. The header 122 may be, for example, a tape that readily attaches to the blade surfaces. The header 122 may attached to the edge extension 110 and blade surfaces by any suitable means, including adhesives, welds, bonding material, mechanical fasteners, and the like.

FIG. 3 depicts an embodiment of a blade assembly 100 wherein respective edge extensions 110 are attached to the leading edge 26 and the trailing edge 28 of the blade 16. An individual respective curtain 118 may be configured with each of the edge extensions 110. In an alternate embodiment depicted in FIG. 3 and FIG. 6, a single continuous curtain 118 may encircle the terminals ends 116 of each of the edge extensions 110, as well as the intermediate portions of the root 34, such that the curtain 118 defines a generally continuous loop-type structure but encircles the edge extensions 110 and root 34.

In the embodiment depicted in FIG. 4, a single blade extension 110 is configured along the trailing edge 28 of the blade 16. The curtain 118 includes the header 122 that encircles the terminal end of the edge extension 110 and has ends 120 that extend onto the surface of the blade, for example on the pressure and suction sides of the blade 16. The header 122 and ends 120 are attached to the edge extension 110 and blade surfaces by any suitable means, including adhesives, welds, bonding material, mechanical fasteners, and the like.

In the embodiments of FIG. 5, a single blade edge extension 110 is attached along the leading edge 26 of the blade 16 and includes a curtain 118 that encircles the terminal end of the extension 110 with a header 122 that is attached to the edge extension 110 with ends 120 that extend onto the pressure and suction side surfaces of the blade 16.

In the embodiment of FIGS. 3 through 5, the curtain 118 is depicted as defined by a brush-like member with bristles 124 that extend generally in a straight span-wise direction from the terminal end of the edge extensions 110 towards the root 34. With this configuration, the bristles 124 encircle the terminal ends 116 of the edge extension 110 and functionally define a continuation of the edge extension outer surface profile.

In the embodiment of FIG. 7, the curtain 118 extends from the terminal end of the edge extensions 110 and tapers radially inward to the root 34. The curtain 118 is gathered and encircles the root 34 so as to form a bag-like enclosure around the portion of the blade from the root 34 to the terminal ends 116 of the edge extensions 110. In this embodiment, the curtain 118 may be defined by bristles 124, as discussed above.

As mentioned, the present invention also encompasses any manner of a wind turbine 10 (FIG. 1) that includes a plurality of rotor blades 16 mounted to a rotor hub 18, wherein any one or combination of the blade 16 includes a blade assembly 100 as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine rotor blade assembly, comprising:
    a rotor blade having a pressure side, a suction side, a leading edge, and a trailing edge extending in a generally span-wise direction between a tip and a root;
    an edge extension attached along either of said leading edge or said trailing edge in a generally span-wise direction from adjacent said root towards said tip, said edge extension comprising a contoured outer surface that defines a generally continuous aerodynamic surface;
    said edge extension having a terminal end spaced from said root;
    a curtain attached to said edge extension and extending in a span-wise direction from said terminal end to said root, said curtain formed from a pliant, flexible material that accommodates connection of said root to a rotor hub and pitch movement of said rotor blade relative to the rotor hub.

2. The blade assembly as in claim 1, wherein said curtain encircles said terminal end and has ends that extend onto said root.

3. The blade assembly as in claim 1, wherein said curtain encircles said terminal end and said root.

4. The blade assembly as in claim 1, comprising a respective said edge extension along both of said leading edge and said trailing edge.

5. The blade assembly as in claim 4, wherein said curtain encircles said terminal ends of said edge extensions and intermediate portions of said root.

6. The blade assembly as in claim 1, wherein said curtain is formed from brush-like bristles that extend span-wise at least to said root.

7. The blade assembly as in claim 6, wherein said curtain comprises a header portion that is attached to said edge extensions.

8. The blade assembly as in claim 6, wherein said bristles extend generally straight from said terminal end.

9. The blade assembly as in claim 6, wherein said bristles extend from said terminal end to said root so as to circumferentially surround said root.

10. A wind turbine, comprising:
    a plurality of rotor blades mounted to a rotor hub, each of the plurality of rotor blades having a pressure side, a suction side, a leading edge, and a trailing edge extending in a generally span-wise direction between a tip and a root;
    an edge extension attached along either of said leading edge or said trailing edge in a generally span-wise direction from adjacent said root towards said tip, said edge extension comprising a contoured outer surface that defines a generally continuous aerodynamic surface;
    said edge extension having a terminal end spaced from said root;
    a curtain attached to said edge extension and extending in a span-wise direction from said terminal end to said root, said curtain formed from a pliant, flexible material that accommodates connection of said root to said rotor hub and pitch movement of said rotor blade relative to said rotor hub.

11. The wind turbine as in claim 10, wherein said curtain encircles said terminal end and has ends that extend onto said root.

12. The wind turbine as in claim 10, wherein said curtain encircles said terminal end and said root.

13. The wind turbine as in claim 10, comprising a respective said edge extension along both of said leading edge and said trailing edge.

14. The wind turbine as in claim 13, wherein said curtain encircles said terminal ends of said edge extensions and intermediate portions of said root.

15. The wind turbine as in claim 10, wherein said curtain is formed from brush-like bristles that extend span-wise at least to said root.

16. The wind turbine as in claim 15, wherein said curtain comprises a header portion that is attached to said edge extensions.

17. The wind turbine as in claim 15, wherein said bristles extend generally straight from said terminal end.

18. The wind turbine as in claim 15, wherein said bristles extend from said terminal end to said root so as to circumferentially surround said root.

* * * * *